United States Patent
Takeuchi et al.

[11] Patent Number: 5,858,904
[45] Date of Patent: *Jan. 12, 1999

[54] CATALYST FOR PRODUCTION OF VINYL-BASED POLYMER AND PROCESS FOR PRODUCTION OF VINYL-BASED AROMATIC POLYMER

[75] Inventors: Mizutomo Takeuchi; Hajime Shouzaki; Norio Tomotsu, all of Ichihara, Japan

[73] Assignee: Idemitsu Kosan Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 525,618
[22] PCT Filed: Mar. 24, 1994
[86] PCT No.: PCT/JP94/00469
§ 371 Date: Sep. 27, 1995
§ 102(e) Date: Sep. 27, 1995
[87] PCT Pub. No.: WO94/22926
PCT Pub. Date: Oct. 13, 1994

[30] Foreign Application Priority Data
Mar. 31, 1993 [JP] Japan ..................... 5-072638

[51] Int. Cl.⁶ ............. B01J 31/00; B01J 37/00; C08F 4/02; C08F 4/60
[52] U.S. Cl. ............. 502/124; 502/123; 502/129; 502/132; 576/160; 576/346; 576/943; 556/43; 556/52; 556/58
[58] Field of Search ............. 526/183, 160, 526/943; 502/121, 128, 118, 119, 123, 133, 124, 114, 129, 132

[56] References Cited

U.S. PATENT DOCUMENTS

| | | | |
|---|---|---|---|
| 5,272,229 | 12/1993 | Tomotsu et al. | 526/115 |
| 5,387,568 | 2/1995 | Ewen et al. | 502/118 |
| 5,430,001 | 7/1995 | Tomotsu et al. | 502/113 |
| 5,461,128 | 10/1995 | Takeuchi et al. | 526/128 |
| 5,739,225 | 4/1998 | Tazaki et al. | 526/160 |
| 5,747,406 | 5/1998 | Reichle et al. | 526/160 |
| 5,759,940 | 6/1998 | Sacchetti et al. | 502/129 |

FOREIGN PATENT DOCUMENTS

| | | |
|---|---|---|
| 0 389 981 | 10/1990 | European Pat. Off. . |
| 0 426 637 | 5/1991 | European Pat. Off. . |
| 0 427 697 | 5/1991 | European Pat. Off. . |
| 0 492 282 | 7/1992 | European Pat. Off. . |
| 0 505 890 | 9/1992 | European Pat. Off. . |
| 0 505 997 | 9/1992 | European Pat. Off. . |
| 0 554 574 | 8/1993 | European Pat. Off. . |
| 63-179906 | 7/1988 | Japan . |
| 63-214009 | 10/1988 | Japan . |
| 4-366109 | 12/1992 | Japan . |

*Primary Examiner*—Mark L. Bell
*Assistant Examiner*—J. Pasterczyk
*Attorney, Agent, or Firm*—Oblon, Spivak, McClelland, Maier & Neustadt, P.C.

[57] ABSTRACT

A catalyst for the production of a vinyl polymer, which comprises: in combination, (A) a transition metal complex of the formula:

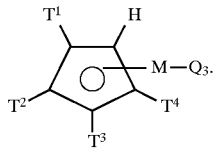

wherein each of $T^1$, $T^2$, $T^3$ and $T^4$, independently of each other, is $C_{1-20}$-alkyl or $C_{6-20}$-aryl, M is a Group IV–VI transition metal and Q is $C_{1-20}$-alkoxy, (B) an aluminoxane or ionic compound having a non-coordinating anion and a cation and (C) a Lewis acid.

Component (B) can be a combination of an aluminoxane and an ionic compound having a non-coordinating anion and a cation.

15 Claims, No Drawings

CATALYST FOR PRODUCTION OF VINYL-BASED POLYMER AND PROCESS FOR PRODUCTION OF VINYL-BASED AROMATIC POLYMER

TECHNICAL FIELD

The present invention relates to a catalyst for producing a vinyl-based polymer such as a polyolefin, and a process for producing a vinyl-based aromatic polymer by using the same, especially a process for efficiently producing a styrenic polymer having a low molecular weight.

BACKGROUND ART

There have heretofore been known the processes for producing high-performance styrenic polymers having a high degree of syndiotactic configuration in high yield by allowing a reaction product of an aluminoxane with a transition metal complex to act on styrene. (Refer to Japanese Patent Application Laid-Open Nos. 187708/1987, 179906/1988, 241009/1988, etc.) The catalyst system containing an aluminoxane has the advantage of high activity, but it is required in the case of methylaluminoxane which has a particularly high activity to use a large amount thereof against a transition metal compound. In particular in order to obtain a styrenic polymer having a molecular weight of 600,000 or less, it is necessary to add a large amount of a Lewis acid to the reaction system or set the temperature at the time of polymerization to a high level. The above-mentioned necessity is responsible for such problems as a large amount of ash remaining in the product polymer and deteriorated catalytic activity.

As a catalyst free from an aluminoxane for producing a styrenic polymer and a process for producing the same without the use of an aluminoxane, there is disclosed in Japanese Patent Application Laid-Open No. 249504/1992, a method for polymerizing a styrenic monomer by the use of a catalyst system which comprises a transition metal compound and a non-coordination ionic compound. However in the case of producing a polymer, a catalyst system not containing an aluminoxane causes difficulty in controlling the molecular weight of the product polymer as compared with a catalyst system containing an aluminoxane. In particular, in order to obtain a styrenic polymer having a weight-average molecular weight of 600,000 or less, it is still necessary to add a large amount of a molecular-weight depressant to the polymerization system or to set the polymerization reaction temperature at a high level. Such necessity brings about a decrease in the catalytic efficiency and an increase in the amount of residual ash, thereby increasing the polymer production cost and deteriorating the physical properties of the resulting polymer.

Under such circumstances, it is an object of the present invention to provide a catalyst for producing a vinyl-based polymer capable of efficiently producing a vinyl product-addition polymer such as polystyrene and polyolefin as well as a process for efficiently producing in a low production cost, an aromatic polymer having a low molecular weight and a high degree of syndiotactic configuration.

DISCLOSURE OF THE INVENTION

As a result of intensive research and investigation accumulated by the present inventors for the purpose of attaining the above-mentioned object, it has been found that the object can be attained by the use of a polymerization catalyst which comprises in combination, a transition metal compound having a tetra-substituted cyclopentadienyl group as a π-ligand, a specific promoter or an ionic complex and a Lewis acid. The present invention has been accomplished on the basis of the foregoing finding and information. In addition, the present invention provides more useful means for solving such problems as catalytic efficiency, thermal stability of the transition metal compound itself, ease of purfication, molecular weight of the resultant polymer etc. in the case of using the above-mentioned transition metal compound having a tetra-substituted cyclopentadienyl group as a π-ligand.

Specifically, the present invention provides (1) a catalyst for the production of vinyl-based polymers which comprises in combination, an (A) transition metal compound having a tetra-substituted cyclopentadienyl group as a π-ligand, a (B) aluminoxane and/or ionic compound having a non-coordinating anion and a cation and a (C) Lewis acid; and (2) a process for the production of vinyl-based aromatic polymers which comprises producing a vinyl-based aromatic polymer by the use of the above-mentioned catalyst in item (1).

As the catalyst for the production of a vinyl-based polymer according to the present invention, the combination of the aforesaid components (A), (B) and (C) is used. As the transition metal compound having a tetra-substituted cyclopentadienyl group as a π-ligand as the component (A), there are preferably used a transition metal compound having one tetra-substituted cyclopentadienyl group as a π-ligand and also a transition metal compound in which at least one σ-ligand is an alkoxyl group. The former is preferable from the viewpoints of catalytic activity and controllability for the molecular weight of the product polymer, while the latter is preferable from the viewpoint of stability. The compound as the component (A) is represented by the general formula (I)

$$RMX_3L_n \qquad (I)$$

wherein R is a tetra-substituted cyclopentadienyl group; M is a transition metal; X is hydrogen atom, a hydrocarbon group having 1 to 20 carbon atoms, an aromatic hydrocarbon group having 6 to 20 carbon atoms, an alkoxyl group having 1 to 20 carbon atoms, an aryloxy group having 6 to 20 carbon atoms, a thioalkoxyl group having 1 to 20 carbon atoms, a thioaryloxyl group having 6 to 20 carbon atoms, an amino group, an amide group, a carboxyl group, an alkylsilyl group or a halogen atom and may be the same as or different from each other, at least one of which is preferably a group other than a halogen atom, hydrogen atom and hydrocarbon group; L is a Lewis base; and n is an integer from 0 to 2.

The tetra-substituted cyclopentadienyl group represented by R in the foregoing general formula (I), which may be polycyclic, is a cyclopentadienyl group in which four carbon atoms out of five carbon atoms which form the ring are substituted with functional groups other than hydrogen atom, and specifically a group represented by the general formula

(II)

wherein $T^1$ to $T^4$ may be the same as or different from each other, and are each an alkyl group having 1 to 20 carbon atoms, an aryl group having 6 to 20 carbon atoms or an arylalkyl group having 7 to 20 carbon atoms. Specific examples of this group include 1,2,3,4-tetramethylcyclopentadienyl group, 1,2,3,4-tetraethylcyclopentadienyl group, 1,2,3,4-tetrapropylcyclopentadienyl group, 1,2,3,4-tetrabenzylcyclopentadienyl group and 1,2,3,4-tetraphenylcyclopentadienyl group.

The transition metal represented by M in the above-mentioned general formula (I) is a transition metal belonging to any of the groups 4 to 6 of the periodic table or to lanthanides series, and exemplified by Ti, Zr, Hf and V, among which Ti is preferable.

X is a hydrogen atom; a hydrocarbon group having 1 to 20 carbon atoms, specifically exemplified by methyl group, ethyl group, propyl group, butyl group, amyl group, isoamyl group, isobutyl group, octyl group, 2-ethylhexyl group, phenyl group and benzyl group; an alkoxyl group having 1 to 20 carbon atoms, specifically exemplified by methoxy group, ethoxy group, propoxy group, butoxy group, amyloxy group, hexyloxy group and 2-ethylhexyloxy group; an aryloxy group having 6 to 20 carbon atoms, specifically exemplified by phenoxy group; a thioalkoxy group having 1 to 20 carbon atoms, specifically exemplified by thiomethoxy group, thioethoxy group, thiopropoxy group and thiobutoxy group; a thioaryloxy group, specifically exemplified by thiophenoxy group; an amino group; an amide group; a carboxyl group; and a halogen atom, specifically exemplified by chlorine atom, bromine atom, iodine atom and fluorine atom, and may be the same as or different from each other, at least one of which is preferably a group other than a halogen atom, hydrogen atom and a hydrocarbon group.

Specific examples of the transition metal compounds that are usable in the process according to the present invention include (1,2,3,4-tetramethylcyclopentadienyl)titanium trimethoxide, (1,2,3,4-tetramethylcyclopentadienyl) titanium triethoxide, (1,2,3,4-tetramethylcyclopentadienyl) titanium tripropoxide, (1,2,3,4-tetramethylcyclopentadienyl)titanium tributoxide, (1,2,3,4-tetramethylcyclopentadienyl)titanium triphenoxide, (1,2,3, 4-tetramethylcyclopentadienyl)titanium trithiomethoxide, (1,2,3,4-tetramethylcyclopentadienyl)titanium thiophenoxide, (1,2,3,4-tetramethylcyclopentadienyl) zirconium trimethoxide, (1,2,3,4-tetramethylcyclopentadienyl)hafnium trimethoxide, (1,2,3, 4-tetramethylcyclopentadienyl)titanium trichloride, (1,2,3, 4-tetramethylcyclopentadienyl)trimethyltitanium, (1,2,3,4-tetramethylcyclopentadienyl)zirconium trichloride, (1,2,3,4-tetramethylcyclopentadienyl)trimethylzirconium, (1,2,3,4-tetramethylcyclopentadienyl)hafnium trichloride and (1,2,3, 4-tetramethylcyclopentadienyl)trimethylhafnium. In addition as a hexadentate ligand, mention is made of (1,2, 3,4-tetramethylcyclopentadienyl)titanium monochlorodimethoxide and (1,2,3,4-trimethylcylopentadienyl) titanium dichloromonomethoxide.

As the component (B) of the catalyst according to the present invention, there is employed an aluminoxane and/or an ionic compound having a non-coordinating anion and a cation. The aluminoxane and the ionic compound function each as a promoter or an activating agent.

Aluminoxane is obtained by bringing any of a variety of organoaluminum compound into contact with a condensing agent. As the organoaluminum compound to be used as a starting material, mention is made of an organoaluminum compounds represented by the general formula:

$$AlR^1_3 \qquad (III)$$

wherein $R^1$ is an alkyl group having 1 to 8 carbon atoms, more specifically, trimethylaluminum, triethylaluminum and triisobutylaluminum, and trimethylaluminum is most desirable.

On the other hand, a typical example of the condensing agent for said organoaluminum compound is water. In addition, any compounds capable of undergoing a condensation reaction with organoaluminum compounds including alkylaluminum can be used.

As the aluminoxane of the component (B), mention is made of a chain alkylaluminoxane represented by the general formula:

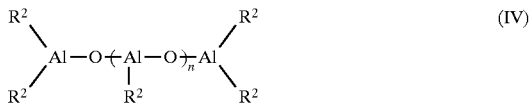

wherein n indicates polymerization degree, and a number of 2 to 50; and $R^2$ represents an alkyl group having 1 to 8 carbon atoms, and a cycloalkylaluminoxane having the repeating unit represented by the general formula:

and the like. Of these alkylaluminoxanes, that wherein $R^2$ is a methyl group, i.e. methylaluminoxane is particularly desirable.

In general, the contact product of an organoaluminum compounds such as trialkylaluminum and water contains the above-mentioned chain alkylaluminoxane and cyclic alkylaluminoxane together with unreacted trialkylaluminum, various mixtures of condensates and further the molecules resulting from association in an intricate manner thereof. Accordingly, the resultant contact product varies widely depending upon the conditions of contact of trialkylaluminum with water as the condensation agent.

The reaction of the alkylaluminum compound and water is not specifically limited in the above case but may be effected according to the publicly known methods.

As the ionic compound to be used as the component (B), there are preferably usable the compounds represented by the general formula (VI) or (VII)

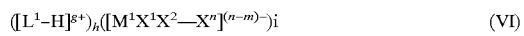

or

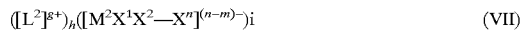

wherein $L^2$ is $M^3$, $R^3R^4M^4$ or $R^5_3C$ as hereinafter described; $L_1$ is a Lewis base; $M^1$ and $M^2$ are each a metal selected from Groups 5 to 15 of the Periodic Table; $M^3$ is a metal selected from Groups 8 to 12 of the Periodic Table; $M^4$ is a metal selected from Groups 8 to 10 of the Periodic Table; $X^1$ to $X^n$ are each a hydrogen atom, dialkylamino group, alkoxy group, aryloxy group, alkyl group having 1 to 20 carbon atoms, aryl group having 6 to 20 carbon atoms, alkylaryl group, arylalkyl group, substituted alkyl group, organometalloid group or halogen atom; $R^3$ and $R^4$ are each a cyclopentadienyl group, substituted cyclopentadienyl group, indenyl group or fluorenyl group; $R^5$ is an alkyl group or an aryl group and may be the same as or different from each other; m is the valency of each of $M^1$ and $M^2$, indicating an integer of 1 to 7; n is an integer of 2 to 8; g is the ion valency of each of $[L^1-H]$ and $[L^2]$, indicating an integer of 1 to 7; h is an integer of 1 or more; and i=h×g/(n-m).

Specific examples of $M^1$ and $M^2$ include B, Al, Si, P, As, Sb, etc.; those of $M^3$ include Ag, Cu, etc.; and those of $M^4$ include Fe, Co, Ni, etc. Specific examples of $X^1$ to $X^n$ include dialkylamino group such as dimethylamino and diethylamino; alkoxyl group such as methoxyl, ethoxyl and n-butoxyl; aryloxyl group such as phenoxyl, 2,6-dimethylphenoxyl and naphthyloxyl; alkyl group having 1 to 20 carbon atoms such as methyl, ethyl, n-propyl, iso-propyl, n-butyl, n-octyl and 2-ethylhexyl; aryl group having 6 to 20 carbon atoms, alkylaryl group or arylalkyl group such as phenyl, p-tolyl, benzyl, pentafluorophenyl, 3,5-di(trifluoromethyl)phenyl, 4-tert-butylphenyl, 2,6-dimethylphenyl, 3,5-dimethylphenyl, 2,4-dimethylphenyl and 1,2-dimethylphenyl; halogen such as F, Cl, Br and I; and organometalloid such as pentamethylantimony group, trimethylsilyl group, trimethylgermyl group, diphenylarsine group, dicyclohexylantimony group and diphenylboron group. Specific examples of substituted cyclopentadienyl group of $R^3$ and $R^4$ include methylcyclopentadienyl, butylcyclopentadienyl and pentamethylcyclopentadienyl.

Among the compounds represented by the general formula (VI) or (VII), specific examples of preferably usable compounds include, as the compound of general formula (VI), triethylammonium tetraphenylborate, tri(n-butyl) ammonium tetraphenylborate, trimethylammonium tetraphenylborate, triethylammonium tetra(pentafluorophenyl)borate, tri(n-butyl)ammonium tetra(pentafluorophenyl)borate, N,N-dimethylanilinium tetra(pentafluorophenyl)borate, N,N-diethylanilinium tetra(pentafluorophenyl)borate, N-methyl-N,N-diphenylammonium tetra(pentafluorophenyl)borate, triethylammonium hexafluoroarsenate, etc., and as the compound of general formula (VII), pyridinium tetra(pentafluorophenyl)borate, pyrrolinium tetra(pentafluorophenyl)borate, ferrocenium tetraphenylborate, dimethylferrocenium tetra(pentafluorophenyl)borate, ferrocenium tetra(pentafluorophenyl)borate, decamethylferrocenium tetra(pentafluorophenyl)borate, acetylferrocenium tetra(pentafluorophenyl)borate, formylferrocenium tetra(pentafluorophenyl)borate, cyanoferrocenium tetra(pentafluorophenyl)borate, silver tetraphenylborate, silver tetra(pentafluorophenyl)borate, trityl tetraphenylborate, trityl tetra(pentafluorophenyl)borate, tri(p-methoxyphenyl) carbenium tetra(pentafluorophenyl)borate, silver hexafluoroarsenate, silver hexafluoroantimonate, silver tetrafluoroborate, etc.

On the other hand, as the Lewis acid to be used as the component (C) of the catalyst according to the present invention, there are available a variety of organometallic compounds, boron compounds, etc., the organometallic compounds being preferably exemplified by organoaluminum compounds represented by the general formula (VIII):

wherein $R^6$ and $R^7$ each independently represent an alkyl group having 1 to 8 carbon atoms, preferably 1 to 4 carbon atoms; X represents a halogen; r, s, t and u are each a number satisfying the relations $0 < r \leq 3$, $0 \leq s < 3$, $0 \leq t < 3$ and $0 \leq u < 3$ respectively, and $r+s+t+u=3$.

The organoaluminum compound represented by the above formula (VIII) can be exemplified as shown below. Those corresponding to $t=u=o$ are represented by the formula: $R^6{}_r Al(OR^7)_{3-r}$ wherein $R^6$ and $R^7$ are as previously defined and r is preferably a number of $1.5 \leq r \leq 3$. Those corresponding to $s=t=0$ are represented by the formula: $R^6{}_r AlX_{3-r}$ wherein $R_6$ and X are as previously defined and r is preferably a number of $0 < r < 3$. Those corresponding to $s=u=0$ are represented by the formula: $R^6{}_r AlH_{3-r}$ wherein $R^6$ is as previously defined and r is preferably a number of $2 \leq r < 3$. Those corresponding to $t=0$ are represented by the formula: $R^6{}_r Al(OR^7)_s X_u$ wherein $R^6$, $R^7$ and $Y^1$ are as previously defined and $0 < r \leq 3$, $0 \leq s < 3$, $0 \leq u < 3$ and $r+s+u=3$.

In the organoaluminum compound represented by the formula (VIII), the compound wherein $t=u=0$ and $r=3$ is selected from, for example, trialkylaluminum such as triethylaluminum and tributylaluminum, or combination thereof, and those preferred are triethylaluminum, tri-n-butylaluminum and triisobutylaluminum. In the case of $t=u=o$ and $1.5 \leq r < 3$, are included dialkylaluminum alkoxide such as diethylaluminum ethoxide and dibutylaluminum butoxide; alkylaluminum sesquialkoxide such as ethylaluminum sesquiethoxide and butylaluminum sesquibutoxide; as well as partially alkoxylated alkylaluminum having an average composition represented by $R^6{}_{2.5}Al(OR^7)_{0.5}$. Examples of the compound corresponding to the case where $s=t=0$ include a partially halogenated alkylaluminum including dialkylaluminum halogenide (r=2) such as diethylaluminum chloride, dibutylaluminum chloride and diethylaluminum bromide; alkylaluminum sesquihalogenide (r=1.5) such as ethylaluminum sesquichloride, butylaluminum sesquichloride and ethylaluminum sesquibromide; and alkylaluminum dihalogenide (r=1) such as ethylaluminum dichloride, propylaluminum dichloride and butylaluminum dibromide. Examples of the compound corresponding to the case in which $s=u=0$ includes a partially hydrogenated alkylaluminum including dialkylaluminum hydride (r=2) such as diethylaluminum hydride and dibutylaluminum hydride; alkylaluminum dihydride (s=r) such as ethylaluminum dihydride and propylaluminum dihydride. Examples of the compound corresponding to the case in which t=0 include a partially alkoxylated and halogenated alkylaluminum such as ethylaluminumethoxy chloride, butylaluminumbutoxy chloride and ethylaluminumethoxy bromide (r=s=u=1).

As the other organometallic compound, mention is made of an organomagnesium compound such as butylethylmagnesium, an alkylzinc compound, an alkyllithium compound, etc. Examples of boron compound include tripentafluoroborate, trifluoroborate and triethylborate.

The catalyst to be used in the process of the present invention comprises the above-mentioned components (A), (B), and (C) as the principal components. A variety of procedures are applicable to the preparation of the catalyst, including (1) a method in which the component (C) is added to the reaction product between the components (A) and (B) to prepare the polymerization catalyst, which is brought into contact with monomer/s to be polymerized; (2) a method in which the component (A) is added to the reaction product between the components (B) and (C) to prepare the catalyst, which is brought into contact with monomer/s to be polymerized; (3) a method in which the component (B) is added to the reaction product between the components (A) and (C) to prepare the polymerization catalyst, which is brought into contact with monomer/s to be polymerized; and (4) a method in which the components (A), (B), and (C) are added one by one to monomer/s to be polymerized to bring each of the components into contact with the monomer/s. There may be employed the reaction product among the components (A), (B) and (C) which has been isolated and purified in advance.

The addition or contact of each of the components (A), (B), and (C) can be carried out, of course, at the polymerization temperature and besides at a temperature in the range of 0° to 100° C.

Examples of vinyl compounds to be preferably polymerized by the use of the catalyst according to the present invention include an olefin such as ethylene, propylene, butene, hexene and octene, a diolefin, acetylenes, etc. in addition to styrene.

The process for producing a styrenic polymer is put into practice by the use of the foregoing catalyst.

In producing the vinyl-based aromatic polymer according to the process of the present invention, a vinyl-based aromatic monomer such as styrenic monomer exemplified by styrene and/or a derivative thereof exemplified by alkylstyrene, alkoxy styrene, halogenated styrene, vinyl benzoate ester or the like is polymerized or copolymerized in the presence of the catalyst comprising the above-mentioned components (A), (B), and (C). As described hereinbefore, there are available various methods of bringing the catalyst of the present invention into contact with the vinyl-based aromatic monomer.

The polymerization of the vinyl-based aromatic monomer such as styrenic monomer may be carried out in bulk or in a solvent such as an aliphatic hydrocarbon exemplified by pentane, hexane and heptane; an alicyclic hydrocarbon exemplified by cyclohexane; or an aromatic hydrocarbon exemplified by benzene, toluene and xylene. The polymerization temperature is not specifically limited, but is 250° C. or lower, preferably 0° to 90° C., more preferably 20° to 70° C. A polymerization temperature exceeding 250° C. unfavorably causes violent thermal polymerization of the monomer. The use of a gaseous monomer as a starting material is not specifically limited.

For the purpose of modifying the molecular weight of the vinyl-based aromatic polymer to be produced, it is effective to proceed with the polymerization reaction in the presence of hydrogen.

The styrenic polymer obtained by the process according to the present invention has a high degree of syndiotactic configuration.

Here, the vinyl-based aromatic polymer such as the styrenic polymer which has a high degree of the syndiotactic configuration means that its stereochemical structure is mainly the syndiotactic configuration, i.e. the stereostructure in which phenyl groups or substituted phenyl groups as side chains are located alternately at opposite directions relative to the main chain consisting of carbon-carbon bonds. Tacticity is quantitatively determined by the nuclear magnetic resonance method ($^{13}$C-NMR method) using carbon isotope. The tacticity as determined by the $^{13}$C-NMR method can be indicated in terms of proportions of structural units continuously connected to each other, i.e., a diad in which two structural units are connected to each other, a triad in which three structural units are connected to each other and a pentad in which five structural units are connected to each other. "The styrenic polymers having such a high degree of syndiotactic configuration" as mentioned in the present invention means polystyrene, poly(alkylstyrene), poly (halogenated styrene), poly(alkoxystyrene), poly(vinyl benzoate), the mixtures thereof, and copolymers containing the above polymers as main components, having such a syndiotacticity that the proportion of racemic diad is at least 75%, preferably at least 85%, or the proportion of racemic pentad is at least 30%, preferably at least 50%. Poly (alkylstyrene) include poly(methylstyrene), poly (ethylstyrene), poly(isopropylstyrene), poly(tert-butylstyrene) etc., poly(halogenated styrene) include poly (chlorostyrene), poly(bromostyrene), poly(fluorostyrene), etc, and poly(alkoxystyrene) include poly(methoxystyrene, poly(ethoxystyrene), etc.

The most desirable styrenic polymers among them are polystyrene, poly(p-methylstyrene), poly(m-methylstyrene), poly(p-tert-butylstyrene), poly(p-chlorostyrene), poly(m-chlorostyrene), poly(p-fluorostyrene), and the copolymer of styrene and p-methylstyrene.

THE MOST PREFERRED EMBODIMENT TO CARRY OUT THE INVENTION

In the following, the present invention will be described more specifically with reference to examples, which however, shall not be construed to limit the present invention thereto.

EXAMPLE 1

<Preparation of catalyst solution>

N,N-dimethylanilinium tetra(pentafluorophenyl)borate in an amount of 0.128 g was suspended in 50 mL (milliliter) of toluene. Subsequently, the resultant suspension was incorporated with 1.8 mL of 2 mol/L (liter) solution of triisobutylaluminum in toluene and 18 mL of 10 mmol/L solution of (1,2,3,4-tetramethylcyclopentadienyl)titanium trimethoxide in toluene and further with toluene so as to make a total volume of 90 mL of the resultant mixed suspension, which was stirred at room temperature for 60 minutes to prepare a catalyst solution, while the procedure was carried out entirely in an atmosphere of nitrogen.

<Polymerization of styrene>

In a 30 mL glass ampule which had been dried and purged with nitrogen were placed 10 mL of styrene and 20 μL (microliter) of 0.5 mol/L solution of triisobutylaluminum in toluene, and the ampule was sealed with a Teflon cap and immersed in an oil bath at 60° C. After the lapse of 15 minutes, to the resultant mixture was added 188 μL of the above-prepared catalyst solution to start polymerization, and the reactant was allowed to stand as it is for 4 hours. Then the polymer thus obtained was crushed, washed with methanol and dried at 150° C. under reduced pressure to recover 5.67 g of a polymer. It was confirmed that the objective polymer was syndiotactic polystyrene having a weight-average molecular weight of 158,000, a syndiotacticity of at least 95% as determined by $^{13}$C-NMR spectrum method and a single melting point at 270° C. The MEK (methyl ethyl ketone)-soluble portion under boiling was at most 3%. The catalytic activity in the polymerization was equivalent to 310 kg/g-Ti.

EXAMPLE 2

The procedure in Example 1 was repeated to prepare the catalyst solution and polymerize styrene by the use of the aforesaid catalyst solution except that (1,2,3,4-tetramethylcyclopentadienyl)titanium trichloride was used in place of (1,2,3,4-tetramethylcyclopentadienyl)titanium trimethoxide. As a result, a polymer was obtained in an amount of 0.53 g expressed in terms of weight after drying and was proved to be a syndiotactic polystyrene having a weight-average molecular weight of 135,000. The catalytic activity in the polymerization was equivalent to 30 kg/g-Ti.

EXAMPLE 3

The procedure in Example 1 was repeated to prepare the catalyst solution and polymerize styrene by the use of the aforesaid catalyst solution except that (1,2,3,4-tetramethylcyclopentadienyl)trimethyltitanium was used in place of (1,2,3,4-tetramethylcyclopentadienyl)titanium trimethoxide. As a result, a polymer was obtained in an amount of 4.27 g expressed in terms of weight after drying and was proved to be a syndiotactic polystyrene having a weight-average molecular weight of 183,000. The catalytic activity in the polymerization was equivalent to 238 kg/g-Ti.

Comparative Example 1

The procedure in Example 1 was repeated to prepare the catalyst solution and polymerize styrene by the use of the aforesaid catalyst solution except that (1-ethyl-2,3,4,5-tetramethylcyclopentadienyl)titanium trimethoxide was used in place of (1,2,3,4-tetramethylcyclopentadienyl)titanium trimethoxide. As a result, a polymer was obtained in an amount of 4.32 g expressed in terms of weight after drying and was proved to be a high-molecular-weight syndiotactic polystyrene having a weight-average molecular weight of 1,595,000. The catalytic activity in the polymerization was equivalent to 241 kg/g-Ti.

EXAMPLE 4

In a 5 L autoclave made of SUS were placed 2 L of styrene and 0.5 mL of 2 mol/L solution of triisobutylaluminum in toluene, followed by heating to 60° C. Subsequently, the resultant mixture was incorporated with 50 mL of the catalyst solution as prepared in Example 1 and subjected to alternate heating and cooling repeatedly so as to maintain the inside temperature at 50° C., to proceed with reaction for 4 hours. Thereafter, the reaction was arrested by adding 100 mL of methanol to the reaction system, and the content in the autoclave was washed with 5 L of methanol. The methanol-insoluble portion was separated by filtration and dried at 150° C. under reduced pressure for 5 hours to recover 1.34 kg of a polymer. It was confirmed that the objective polymer was syndiotactic polystyrene having a weight-average molecular weight of 210,000, a molecular weight distribution of 2.34, a syndiotacticity of at least 95% as determined by $^{13}$C-NMR spectrum method and a single melting point at 270° C. The MEK (methyl ethyl ketone)-soluble portion under boiling was at most 2%. The catalytic activity in the polymerization was equivalent to 280 kg/g-Ti, and the amount of the residual ash was 4 ppm as Ti and 45 ppm as Al.

EXAMPLE 5

The procedure in Example 4 was repeated to carry out the polymerization of styrene except that the catalyst solution and the 2 mol/L solution of triisobutylaluminum in toluene which was incorporated in styrene were used in amounts of 40 mL (instead of 50 mL) and 0.4 mL (instead of 0.5 mL), respectively.

As a result, a polymer was obtained in an amount of 1.18 kg expressed in terms of weight after drying and was proved to be a syndiotactic polystyrene having a weight-average molecular weight of 200,000, a molecular weight distribution of 2.25, a syndiotacticity of at least 95% as determined by $^{13}$C-NMR spectrum method and a single melting point at 270° C. The MEK-soluble portion under boiling was at most 2%. The catalytic activity in the polymerization was equivalent to 307 kg/g-Ti.

The resultant polymer was incorporated with an antioxidant and melt molded to produce a molding. A measurement was made of the yellowness index of the resultant molding. The result was 7. Then the molding was allowed to stand in an atmosphere of air at 150° C. for 24 hours to carry out oxidation acceleration test with the result that yellowness index was 19.

Comparative Example 2

The procedure in Example 1 was repeated to prepare the catalyst solution and polymerize styrene by the use of the aforesaid catalyst solution except that penta-substituted (1-ethyl-2,3,4,5-tetramethylcyclopentadienyl)titanium trimethoxide was used in place of (1,2,3,4-tetramethylcyclopentadienyl)titanium trimethoxide and that the inside temperature was set at 80° C.

As a result, a polymer was obtained in an amount of 758 g expressed in terms of weight after drying and was proved to be a syndiotactic polystyrene having a weight-average molecular weight of 656,000, and a molecular weight distribution of 2.85. In spite of the elevated polymerization temperature, the resultant polymer had a high molecular weight and the MEK-soluble portion under boiling was as high as 5%. The catalytic activity in the polymerization was equivalent to 158 kg/g-Ti.

Comparative Example 3

The procedure in Example 1 was repeated to prepare the catalyst solution and the procedure in example 2 was repeated to polymerize styrene by the use of the aforesaid catalyst solution except that pentamethylcyclopentadienyltitanium trimethoxide was used in place of (1,2,3,4-tetramethylcyclopentadienyl)titanium trimethoxide, that the inside temperature was set at 80° C., and that the catalyst solution and the 2 mol/L solution of triisobutylaluminum in toluene which was incorporated in styrene were used in amounts of 75 mL and 2.25 mL, respectively. As a result, a polymer was obtained in an amount of 1.43 kg expressed in terms of weight after drying and was proved to be a syndiotactic polystyrene having a weight-average molecular weight of 253,000, a molecular weight distribution of 2.55, a syndiotacticity of at least 95% as determined by $^{13}$C-NMR spectrum method and a single melting point at 269° C. The MEK-soluble portion under boiling was 5%. The catalytic activity in the polymerization was equivalent to 199 kg/g-Ti.

The resultant polymer was incorporated with an antioxidant and melt molded to produce a molding. A measurement was made of the yellowness index of the resultant molding. The result was 10. Then, the molding was allowed to stand in an atmosphere of air at 150° C. for 24 hours to carry out oxidation acceleration test with the result that yellowness index was as high as 35. The yellowing of the molding was clearly seen by visual observation.

EXAMPLE 6

In a 1 L autoclave made of SUS was placed 400 mL of heptane, which was then heated to 80° C. and was incorporated with 20 mL of the catalyst solution as prepared in Example 1. Subsequently, ethylene was fed in the autoclave and polymerized for 30 minutes at a constant ethylene pressure of 0.4 MPa, while the content was subjected to alternate heating and cooling repeatedly so as to maintain the inside temperature at 80° C. Thereafter, the reaction was arrested by adding 20 mL of methanol to the reaction system. The precipitate polymer, which was in granular form, was washed with 5 L of methanol. As a result, a polymer was obtained in an amount of 44.4 g expressed in terms of weight after drying, and was proved to be polyethylene having a viscosity of 1.71 as determined in decaline at 130° C.

Comparative Example 4

The procedure in Example 6 was repeated to polymerize ethylene except that the catalyst solution containing pentamethylcyclopentadienyltitanium trimethoxide as prepared in Comparative Example 3 was used. As a result, polyethylene was obtained in an amount of 8.4 g on dry base and had a viscosity of 12.3 as determined in decaline at 130° C., thereby showing an extremely high molecular weight.

EXAMPLE 7

In a 30 mL glass ampule which had been dried and purged with nitrogen were placed 10 mL of styrene and 30 μmol of triisobutylaluminum, and the ampule was sealed with a Teflon cap, followed by temperature raising to 70° C. In the ampule were further successively placed 0.5 μmol of (1,2,3,4-tetramethylcyclopentadienyl)titanium trimethoxide and 0.5 μmol of bis(cyclopentadienyl)ferrocenium tetra (pentafluorophenyl)borate to proceed with polymerization at 70° C. for 4 hours. After the completion of the reaction, the reaction product was washed with methanol and dried to afford 4.30 g of a polymer. The resultant polymer was subjected to Soxhlet extraction for 5 hours by the use of boiling methyl ethyl ketone (MEK) as the solvent to produce MIP (MEK-insoluble portion). As the result, syndiotactic polystyrene was obtained at a yield of 3.18 g. The resultant syndiotactic polystyrene had a weight-average molecular weight of 118,000. The catalytic activity in the polymerization was 133 kg/g-Ti.

Comparative Example 5

The procedure in Example 7 was repeated to proceed with polymerization except that triisobutylaluminum was not used. As a result, a polymer was recovered in a yield of 0.23 g, but was totally dissolved in MEK. It turned out to be an atactic polystyrene without a definite melting point.

EXAMPLE 8

A catalyst solution was prepared, in advance, by mixing in a nitrogen atmosphere, 10 mL of 0.1 mol/L solution of triisobutylaluminum, 5 mL of 10 mmol/L solution of (1,2,3,4-tetramethylcyclopentadienyl)trimethyltitanium, 5 mL of 10 mmol/L slurry of N,N-dimethylanilinium tetra (pentafluorophenyl)borate, each in toluene as a solvent and 5 mL of toluene. Subsequently, in a 30 mL glass ampule which had been dried and purged with nitrogen was placed 10 mL of styrene and the ampule was sealed with a Teflon cap, heated to 70° C. and charged with 250 μL of the above-prepared mixed catalyst solution to proceed with polymerization at 70° C. for 4 hours.

After the completion of the reaction, the reaction product was washed with methanol and dried to afford 4.72 g of a polymer. The resultant polymer was subjected to Soxhlet extraction for 5 hours by the use of boiling methyl ethyl ketone (MEK) as the solvent to produce MIP (MEK-insoluble portion). As the result, syndiotactic polystyrene was obtained at a yield of 4.50 g. The resultant syndiotactic polystyrene had a weight-average molecular weight of 99.000. The catalytic activity in the polymerization was 188 kg/g-Ti.

Comparative Example 6

The procedure in Example 8 was repeated to prepare catalyst solution except that triisobutylaluminum was not used. AS a result, there was produced an oil which was insoluble in toluene. An attempt was made to recover a polymer by adding the product to styrene, but it turned out to be failure.

EXAMPLE 9

The procedure in Example 7 was repeated to proceed with polymerization except that there were used 50 μmol of methylaluminoxane in place of 0.5 μmol of bis (cyclopentadienyl)ferrocenium tetra(pentafluorophenyl) borate, 50 μmol of triisobutylaluminum in place of 30 μmol of the same and 0.25 μmol of (1,2,3,4-tetramethylcyclopentadienyl)titanium trimethoxide in place of 0.5 μmol of the same and the polymerization was carried out for one hour. As a result, a syndiotactic polystyrene having a weight-average molecular weight of 250,000 was obtained in a yield of 1.65 g. The catalytic activity in the polymerization was 138 kg/g-Ti.

Comparative Example 7

The procedure in Example 9 was repeated to proceed with polymerization except that triisobutylaluminum was not used. As a result, a syndiotactic polystyrene having a weight-average molecular weight of 300,000 was obtained in an amount of 1.23 g. The catalytic activity in the polymerization was as low as 102 kg/g-Ti.

As described in detail hereinbefore, the catalyst of the present invention has a high catalytic-activity. According to the process of the present invention which makes use of the catalyst of the invention, it is made possible to produce a styrenic polymer which has a high degree of syndiotactic configuration and a low molecular weight, hardly causes yellowing and is minimized in the content of residual metals, at a low production cost in high efficiency through simplified steps.

INDUSTRIAL APPLICABILITY

As described in detail hereinbefore, the catalyst according to the present invention can favorably be used as a catalyst for the production of a vinyl-based polymer such as polystyrene and polyolefin, and according to the process of the present invention, it is made possible to produce a vinyl-based aromatic polymer such as a styrenic polymer which has a high degree of syndiotactic configuration and a low molecular weight, at a low production cost in high efficiency through simplified steps.

We claim:

1. A catalyst for the production of a vinyl aromatic polymer, which comprises: in combination, (A) a transition metal complex of the formula:

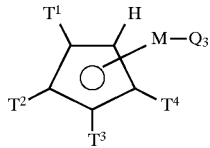

wherein each of $T^1$, $T^2$, $T^3$ and $T^4$, independently of each other, is $C_{1-20}$-alkyl or $C_{6-20}$-aryl, M is a Group IV–VI transition metal and Q is $C_{1-20}$ or $-SCH_3$, (B) an aluminoxane or ionic compound having a non-coordinating anion and a cation and (C) a Lewis acid.

2. The catalyst of claim 1, wherein M is Ti, Hf or Zr.

3. The catalyst of claim 1, wherein said (C) Lewis acid is a compound of formula: $AlR^1_3$, wherein $R^1$ is a $C_{1-8}$-alkyl.

4. The catalyst of claim 1, wherein the aluminoxane has the formula:

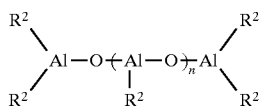

wherein n is a integer from 2 to 50 and $R^2$ is $C_{1-8}$-alkyl or said aluminoxane is a cycloalkylaluminoxane of the formula (V):

wherein $R^2$ is as defined above.

5. The catalyst of claim 1, wherein groups $T^1$ to $T^4$ are each methyl.

6. The catalyst of claim 1, wherein said Lewis acid is selected from the group consisting of an organoaluminum compound of formula (VIII):

$$R^6_rAl(OR^7)_sH_tX_u$$

wherein $R^6$ and $R^7$ each independently represent a $C_{1-8}$-alkyl group; X is a halogen; r, s, t and u each have a value within the ranges: $0<r\leq 3$, $0\leq s<3$, $0\leq t<3$, and $0\leq u<3$, and r+s+t+u=3; an organomagnesium compound, an alkylzinc compound and an alkyllithium compound.

7. The catalyst of claim 1, wherein said transition metal complex (A) is a member selected from the group consisting of (1,2,3,4-tetramethylcyclopentadienyl)titanium trimethoxide, (1,2,3,4-tetramethylcyclopentadienyl) titanium triethoxide, (1,2,3,4-tetramethylcyclopentadienyl) titanium tripropoxide, (1,2,3,4-tetramethylcyclopentadienyl)titanium tributoxide, (1,2,3,4-tetramethylcyclopentadienyl)titanium triphenoxide, (1,2,3,4-tetramethylcyclopentadienyl)titanium $(—SCH_3)_3$, (1,2,3,4-tetramethylcyclopentadienyl)zirconium trimethoxide, and (1,2,3,4-tetramethylcyclopentadienyl)hafnium trimethoxide.

8. A catalyst for the production of a vinyl aromatic polymer, which comprises: in combination, (A) a transition metal complex of the formula:

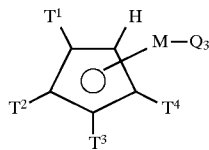

wherein each of $T^1$, $T^2$, $T^3$ and $T^4$, independently of each other, is $C_{1-20}$-alkyl or $C_{6-20}$-aryl, M is a Group IV–VI transition metal and Q is $C_{1-20}$ or $—SCH_3$, (B) an aluminoxane and an ionic compound having a non-coordinating anion and a cation and (C) a Lewis acid.

9. The catalyst of claim 8, wherein M is Ti.

10. The catalyst of claim 8, wherein said Lewis acid is selected from the group consisting of an organoaluminum compound of formula (VIII):

$$R^6_rAl(OR^7)_sH_tX_u$$

wherein $R^6$ and $R^7$ each independently represent a $C_{1-8}$-alkyl group; X is a halogen; r, s, t and u each have a value within the ranges: $0<r\leq 3$, $0\leq s<3$, $0\leq t<3$ and $0\leq u<3$, and r+s+t+u=3; an organomagnesium compound, an alkylzinc compound and an alkyllithium compound.

11. The catalyst of claim 8, wherein said transition metal complex (A) is a member selected from the group consisting of (1,2,3,4-tetramethylcyclopentadienyl)titanium trimethoxide, (1,2,3,4-tetramethylcyclopentadienyl) titanium triethoxide, (1,2,3,4-tetramethylcyclopentadienyl) titanium tripropoxide, (1,2,3,4-tetramethylcyclopentadienyl)titanium tributoxide, (1,2,3,4-tetramethylcyclopentadienyl)titanium triphenoxide, (1,2,3,4-tetramethylcyclopentadienyl)titanium $(—SCH_3)_3$, (1,2,3,4-tetramethylcyclopentadienyl)zirconium trimethoxide, and (1,2,3,4-tetramethylcyclopentadienyl)hafnium trimethoxide.

12. A process for the production of a vinyl aromatic polymer, which comprises:
polymerizing a vinyl aromatic monomer in the presence of a catalyst which is a combination of (A) a transition metal complex of the formula:

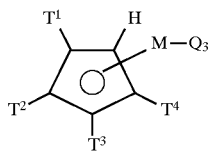

wherein each of $T^1$, $T^2$, $T^3$ and $T^4$, independently of each other, is $C_{1-20}$-alkyl or $C_{6-20}$-aryl, M is a Group IV–VI transition metal and Q is $C_{1-20}$-alkoxy, (B) an aluminoxane or ionic compound having a non-coordinating anion and a cation and (C) a Lewis acid.

13. The process of claim 12, wherein said Lewis acid is a member selected from the group consisting of an organoaluminum compound of formula (VIII):

$$R^6_rAl(OR^7)_sH_tX_u$$

wherein $R^6$ and $R^7$ each independently represent a $C_{1-8}$-alkyl group; X is a halogen; r, s, t and u each have a value within the ranges: $0<r\leq 3$, $0\leq s<3$, $0\leq t<3$, and $0\leq u<3$, and r+s+t+u=3; an organomagnesium compound, an alkylzinc compound and an alkyllithium compound.

14. A process for the production of a vinyl polymer, which comprises:
polymerizing a vinyl aromatic monomer in the presence of a catalyst which is a combination of (A) a transition metal complex of the formula:

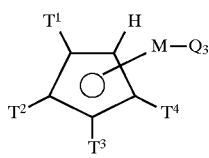

wherein each of $T^1$, $T^2$, $T^3$ and $T^4$, independently of each other, is $C_{1-20}$-alkyl or $C_{6-20}$-aryl, M is a Group IV–VI transition metal and Q is $C_{1-20}$-alkoxy, (B) an aluminoxane and an ionic compound having a non-coordinating anion and a cation and (C) a Lewis acid.

15. The process of claim 14, wherein said Lewis acid is a member selected from the group consisting of an organoaluminum compound of formula (VIII):

$$R^6_rAl(OR^7)_sH_tX_u$$

wherein $R^6$ and $R^7$ each independently represent a $C_{1-8}$-alkyl group; X is a halogen; r, s, t and u each have a value within the ranges: $0<r\leq 3$, $0\leq s<3$, $0\leq t<3$, and $0\leq u<3$, and r+s+t+u=3; an organomagnesium compound, an alkylzinc compound and an alkyllithium compound.

* * * * *